United States Patent
Bosses

[11] Patent Number: 5,613,989
[45] Date of Patent: Mar. 25, 1997

[54] SELF-ALIGNING SELF-SEALING VACUUM BAG

[75] Inventor: Mark D. Bosses, Montvale, N.J.

[73] Assignee: Home Care Industries, Inc., Clifton, N.J.

[21] Appl. No.: 541,418

[22] Filed: Oct. 10, 1995

[51] Int. Cl.⁶ ............................................. B01D 46/00
[52] U.S. Cl. ........................ 55/367; 55/377; 55/378; 15/350
[58] Field of Search ..................... 15/347, 350; 55/367, 55/374, 375, 376, 377, 378

[56] References Cited

U.S. PATENT DOCUMENTS

| | | |
|---|---|---|
| 3,237,846 | 3/1966 | Brown . |
| 3,392,906 | 7/1968 | Fesco . |
| 3,421,298 | 1/1969 | Downey . |
| 3,432,997 | 3/1969 | Downey et al. . |
| 3,432,998 | 3/1969 | Downey et al. . |
| 3,724,179 | 4/1973 | Leinfelt . |
| 3,933,451 | 1/1976 | Johansson . |
| 4,861,357 | 8/1989 | Gavin et al. ............................ 55/374 |
| 4,961,765 | 10/1990 | Guhne et al. ........................... 55/367 |
| 5,039,324 | 8/1991 | Goldberg . |
| 5,468,271 | 11/1995 | Sauer et al. ............................. 55/377 |
| 5,468,272 | 11/1995 | Schmierer ............................... 55/377 |
| 5,472,460 | 12/1995 | Schmierer ............................... 55/367 |

*Primary Examiner*—C. Scott Bushey
*Attorney, Agent, or Firm*—Amster, Rothstein & Ebenstein

[57] ABSTRACT

A vacuum bag for use with a vacuum device having a dirty air vacuum inlet has a conventional self-sealing collar including a pair of apertured planar panels, an apertured resilient membrane therebetween, and a finger extending at least partially across the outer panel aperture. However the collar is made self-aligning with a vacuum inlet by adding a third planar panel disposed parallel to and outwardly of the pair of panels. The third panel defines a respective third aperture therethrough configured and dimensioned for receipt of a vacuum inlet therethrough and aligned with the apertures of the pair of panels. The third aperture is of a thickness to facilitate blind placement of the collar on a vacuum inlet. In a combination of the bag and a vacuum device, the dirty air inlet extends through the three panel apertures as well as the membrane aperture of the collar.

9 Claims, 3 Drawing Sheets

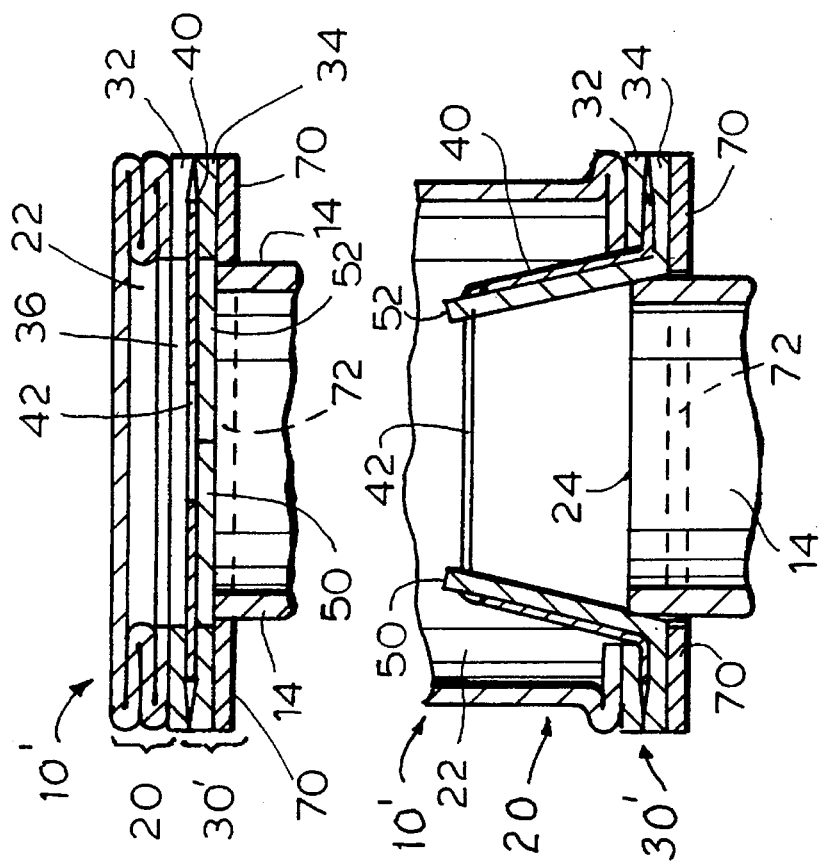
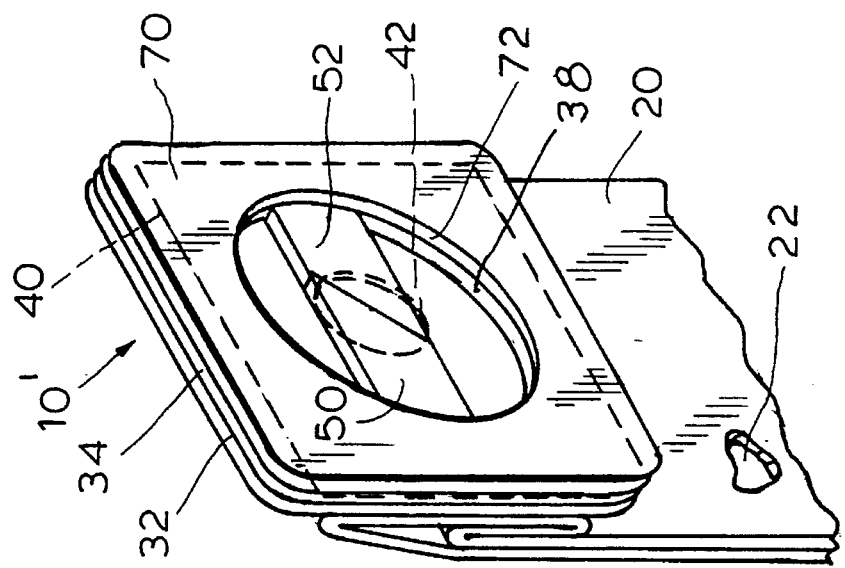

SELF-ALIGNING SELF-SEALING VACUUM BAG

BACKGROUND OF THE INVENTION

The present invention relates to a vacuum bag having a self-sealing collar, and more particularly to such a bag wherein the collar is also self-aligning with a dirty air inlet of a vacuum device so as to facilitate blind placement of the collar on the vacuum inlet.

Vacuum devices may be divided generally into two types: the dirty air type and the clean air type. In terms of the travel path of the air through the vacuum device, in the dirty air type the vacuum-generating motor is disposed between the dirty air vacuum inlet and the vacuum bag, while in the clean air type, the dirty air vacuum inlet communicates directly with the vacuum bag and the vacuum-generating motor is disposed after the vacuum bag. Vacuum devices generally come in two styles: an upright style which has a long handle for moving the entire vacuum device backwards and forwards therewith as a unit, and a canister style which has a long handle that is attached by a flexible base to a rolling or sliding canister seated on the floor and is movable to a limited extent without movement of the canister. Generally, upright models are of the dirty air type, while canister models are of the clean air type. More recently, however, there are upright models of the clean air type of vacuum device, and these have presented special problems in mounting of a self-sealing vacuum bag on the dirty air inlet of the vacuum device.

While the present invention is especially designed to solve this problem which arises especially in an upright model of the clean air type, the vacuum bag of the present invention is in fact useful with both the upright and canister models, regardless of whether they are of the clean or dirty air type.

Referring now to FIGS. 1–3, therein illustrated is a conventional self-sealing disposable vacuum bag, generally designated by the reference numeral 10. As illustrated in FIG. 1, the bag 10 is shown being mounted on a conventional upright model vacuum device of the clean air type, generally designated 12. The vacuum device 12 has a dirty air inlet 14 in direct communication with the bag 10, a downstream motor 16 for creating a vacuum within the chamber 18 about the bag 10 when the chamber is closed, and a handle 19. The bag 10 as illustrated in phantom line in FIG. 1 in its mounted position. The illustrated vacuum device 12 is an upright model of the clean air type wherein the dirty air from the vacuum inlet 14 must pass through the bag 20 (and thus be cleaned) before it is drawn into the motor 16.

The bag 10 comprises porous bag means 20 for trapping dirt, dust and particles in the dirty air stream exiting dirty air vacuum inlet 14 while allowing air (presumably clean air) to pass therethrough under the influence of a vacuum thereabout created by motor 16. The bag means 20 defines a bag interior 22 and a channel 24 through the bag means 20 into the bag interior 22.

The bag 10 additionally includes a self-sealing collar, generally designated 30. The collar 30 is secured to the bag means 20 (typically by adhesive) and communicates with the bag interior 22 via the channel 24. The self-sealing collar 30 is similar to a conventional non-self-sealing collar in that it includes an adhesively bonded pair of parallel planar panels 32, 34 defining aligned respective circular apertures 36, 38 therethrough. The inner panel 32 is typically secured directly to the bag means 20 with its respective panel aperture 36 aligned with the channel 24. The outer panel 34 defines a respective panel aperture 38, which is typically the same size (i.e., diameter) and aligned with the panel aperture 36. Both of the aligned panel apertures 36, 38 are configured and dimensioned for receipt of a dirty air inlet 14 therethrough, thereby to establish communication between the dirty air inlet 14 and the bag interior 22 via the channel 24. A resilient membrane 40, typically formed of rubber, is disposed intermediate the pair of panels 32, 34 and extends across panel apertures 36, 38. The membrane 40 defines an aperture 42 therethrough aligned with but smaller than (i.e., of lesser diameter than) the panel apertures 36, 38. Typically, the peripheral edge or margin of the membrane 40 is adhesively bonded to the adjacent surfaces of the panels 32, 34.

The vacuum bag 10 as described hereinabove is not self-sealing, but it is self-aligning in that the user can grasp the collar 30 with the outer panel 34 facing the inlet 14 of the vacuum device and bearing thereagainst. The user then simply moves the bag around until the dirty air inlet 14 enters the panel aperture 38 of the outer panel 34 and further movement of the collar 30 relative to the inlet 14 is blocked. At this point, the user manually presses the bag harder against the inlet 14 until the inlet 14 expands the membrane aperture 42 and then passes therethrough and through the inner panel aperture 36 and channel 24, thus establishing communication with the bag interior 22.

The aforedescribed non-self-sealing bag is converted to a self-sealing bag by the inclusion in the outer panel 34 of at least one finger 50, and preferably two fingers 50, 52 as illustrated. The fingers 50, 52 are integral with and formed of the same somewhat rigid material (e.g., cardboard or paperboard) as the outer panel 34, but each finger is pivotable relative to the plane of the outer panel 34 about the juncture of the outer panel 34 and the respective finger. The finger(s) 50, 52 extend inwardly in the plane of the outer panel 34 at least partially across the respective outer panel aperture 38 and collectively fully across the membrane aperture 42 prior to placement of the collar 30 on the dirty air vacuum inlet 14, as illustrated in FIGS. 2 and 3.

When the collar 30 is then disposed on a vacuum inlet 14, the vacuum inlet 14 forces the finger(s) 50, 52 through the membrane aperture 42 and the inner panel aperture 38. In this position, the finger(s) 50, 52 do not interfere with the transmission of dirty air from the vacuum inlet 14 into the bag interior 22. Later, when the collar 30 is removed from the vacuum inlet 14, the finger(s) 50, 52 extend substantially parallel to and partially behind the membrane 40 and across the membrane aperture 42 to effectively close the membrane aperture 42 and thus the bag 10. As the collar 30 is being removed from the inlet 14, the membrane 40 is biased to return to its original planar configuration with a membrane aperture 42 of substantially lesser diameter than the vacuum inlet 14. The finger(s) 50, 52 are sufficiently long that they come into contact with the back of portions of the membrane 40 on either side of the membrane aperture 42 and force such portions forwardly. The finger(s) 50, 52 are of sufficient length and width that, when they assume an almost planar orientation after the bag 10 is removed from the inlet 14, the finger 50 extends across and blocks the membrane aperture 42 (or the fingers 50, 52 collectively extend across and block the membrane aperture 42).

The price paid for the addition of the finger(s) 50, 52 or any equivalent means extending in the plane of and at least partially across the outer panel aperture 38 is the loss of the self-aligning feature. Thus, when the user (illustrated in phantom line in FIG. 1) attempts to blindly place the bag collar on the inlet 14, as illustrated in FIG. 1, the inlet 14 cannot enter the outer panel aperture 38 but is blocked by the presence of the finger(s) 50, 52 extending substantially across and in the plane of the aperture 38. Accordingly, the user cannot tell when the outer panel aperture 38 is aligned with the vacuum inlet 14. If the user pushes the collar 30 onto the inlet 14 when the collar 30 is not properly positioned (i.e., when the outer panel aperture 38 is not aligned with the vacuum inlet 14), the paperboard panels 32, 34 may become deformed, thereby jeopardizing efficient operation of the bag 10.

As a result, typically vacuum bag 10 is not used with the illustrated vacuum machine 12. In fact, vacuum bag 10 has been typically used in cannister models where the vacuum device itself includes a self-aligning feature, typically a frame in the vacuum device that receives and holds the perimeter of the vacuum bag in an appropriate position for entry of the vacuum inlet.

While there exists self-sealing vacuum bag mechanisms which do not employ a finger(s) extending in the plane of and at least partially across the outer panel aperture, these alternative self-sealing mechanisms have not found the wide acceptability of the finger mechanisms described above.

Accordingly, it is an object of the present invention to provide a vacuum bag having a self-sealing and self-aligning collar.

Another object is to provide such a vacuum bag which employs finger means extending in the plane of and at least partially across a panel aperture for blocking the membrane aperture.

A further object is to provide such a vacuum bag which facilitates blind placement of the collar on a vacuum inlet, especially the vacuum inlet of an upright model of a clean air type of vacuum device.

It is also an object of the present invention to provide such a bag which is simple and economical to manufacture.

SUMMARY OF THE INVENTION

It has now been found that the above and related objects of the present invention are obtained in a vacuum bag for use with a vacuum device having a dirty air vacuum inlet. The bag comprises porous bag means and a self-sealing collar.

The porous bag means traps dirt, dust and particles therein while allowing air to pass therethrough under the influence of a vacuum thereabout. The bag means defines a bag interior and a channel through the bag means thereinto.

The self-sealing collar is secured to the bag means and communicates with the bag interior via the channel. The collar includes a pair of parallel planar panels defining aligned respective apertures therethrough configured and dimensioned for receipt of a vacuum inlet therethrough, and a resilient membrane disposed intermediate the pair of panels, the membrane defining an aperture therethrough aligned with but smaller than the panel apertures. To provide a self-sealing feature, the collar includes at least one finger means on the outer of the pair of panels. The finger means normally extends inwardly in the plane of the outer panel at least partially across the outer panel aperture prior to placement of the collar on a vacuum inlet, extends through the membrane aperture and past the inner of the pair of the panels when the collar is disposed on a vacuum inlet, and extends substantially parallel to and partially behind the membrane and across the membrane aperture, thereby to effectively close the membrane aperture, when the collar is removed from a vacuum inlet.

To make the collar self-aligning with a vacuum inlet, the collar further includes a third planar panel disposed parallel to and outwardly of the pair of panels. The third panel defines a respective third aperture therethrough configured and dimensioned for receipt of a vacuum inlet therethrough and aligned with the apertures of the pair of panels. The third aperture is of a thickness to facilitate blind placement of the collar on a vacuum inlet.

In a preferred embodiment, each of the three panels has about the same thickness, and the third panel defines a respective third aperture with a sidewall inclined to facilitate self-alignment of the collar on a vacuum inlet. Preferably the collar has a pair of diametrically opposed finger means extending inwardly towards one another from diametrically opposite sides of the outer panel aperture to collectively effectively close the membrane aperture.

The present invention further encompasses a combination of the bag and a vacuum device having a dirty air inlet extending through the three panel apertures and the membrane aperture of the collar. Preferably the vacuum device is an upright model of the clean air type.

BRIEF DESCRIPTION OF THE DRAWING

The above and related objects, features, and advantages of the present invention will be more fully understood by reference to the following detailed description of the presently preferred, albeit illustrative, embodiments of the present invention when taken in conjunction with the accompanying drawing wherein:

FIG. 5 is an assembly view of the vacuum bag;

FIG. 6 is a sectional view of the bag in alignment with the vacuum inlet; and

FIG. 7 is a fragmentary sectional view of the vacuum bag being pushed against the vacuum inlet.

DETAILED DESCRIPTION OF THE PREFERRED EMBODIMENTS

Figures 1, 2, 3:
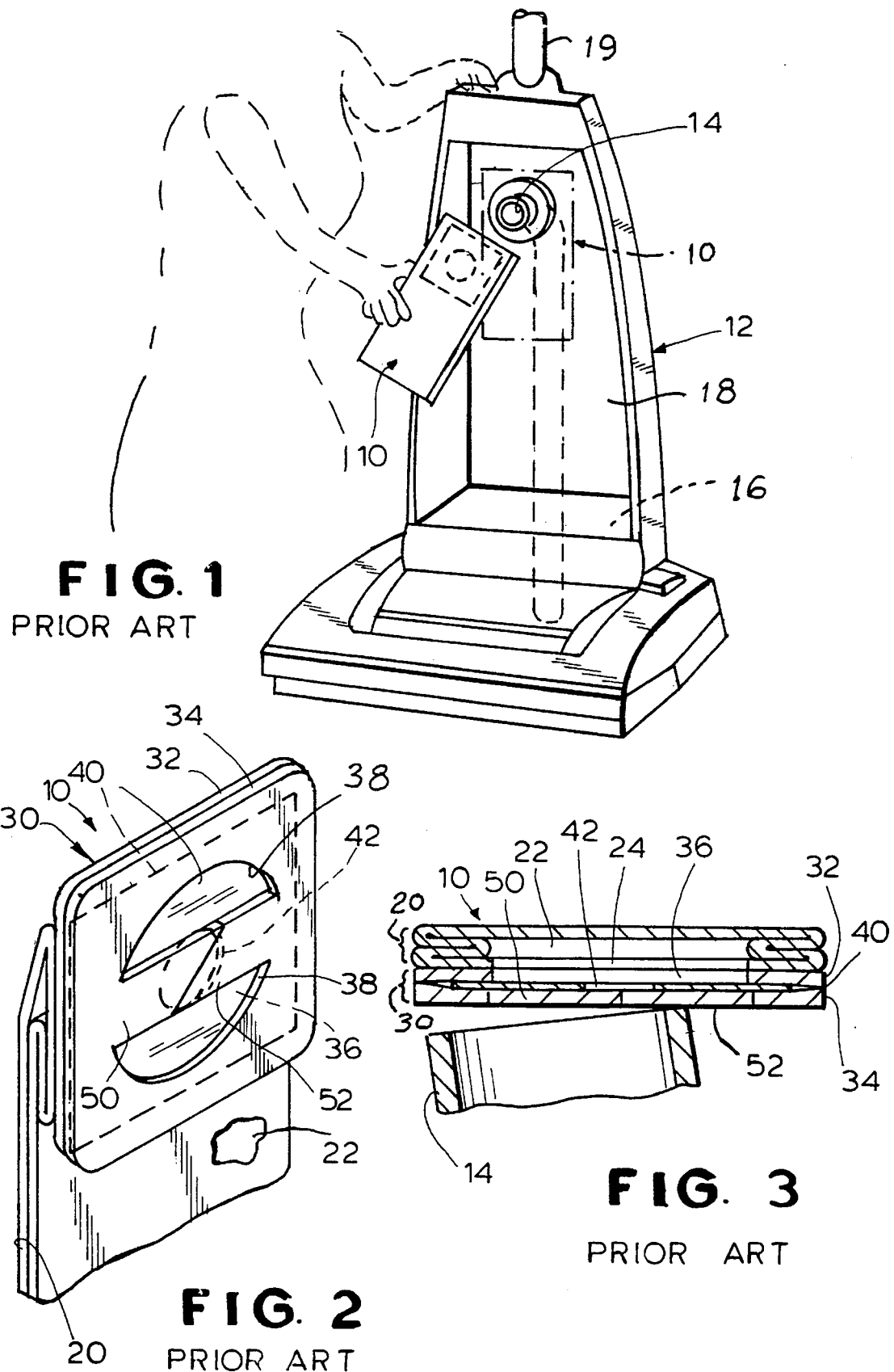
FIG. 1 is fragmentary view of a user (in phantom line) attempting to mount a prior art self-sealing vacuum bag on an upright model of a clean air type vacuum device (the front of the vacuum device having been removed for this purpose)
FIG. 2 is a fragmentary isometric view of a prior art self-sealing vacuum bag.
FIG. 3 is a fragmentary view showing the prior art self-sealing vacuum bag of FIG. 2 being blindly fitted onto a dirty air vacuum inlet.
Figure 4:
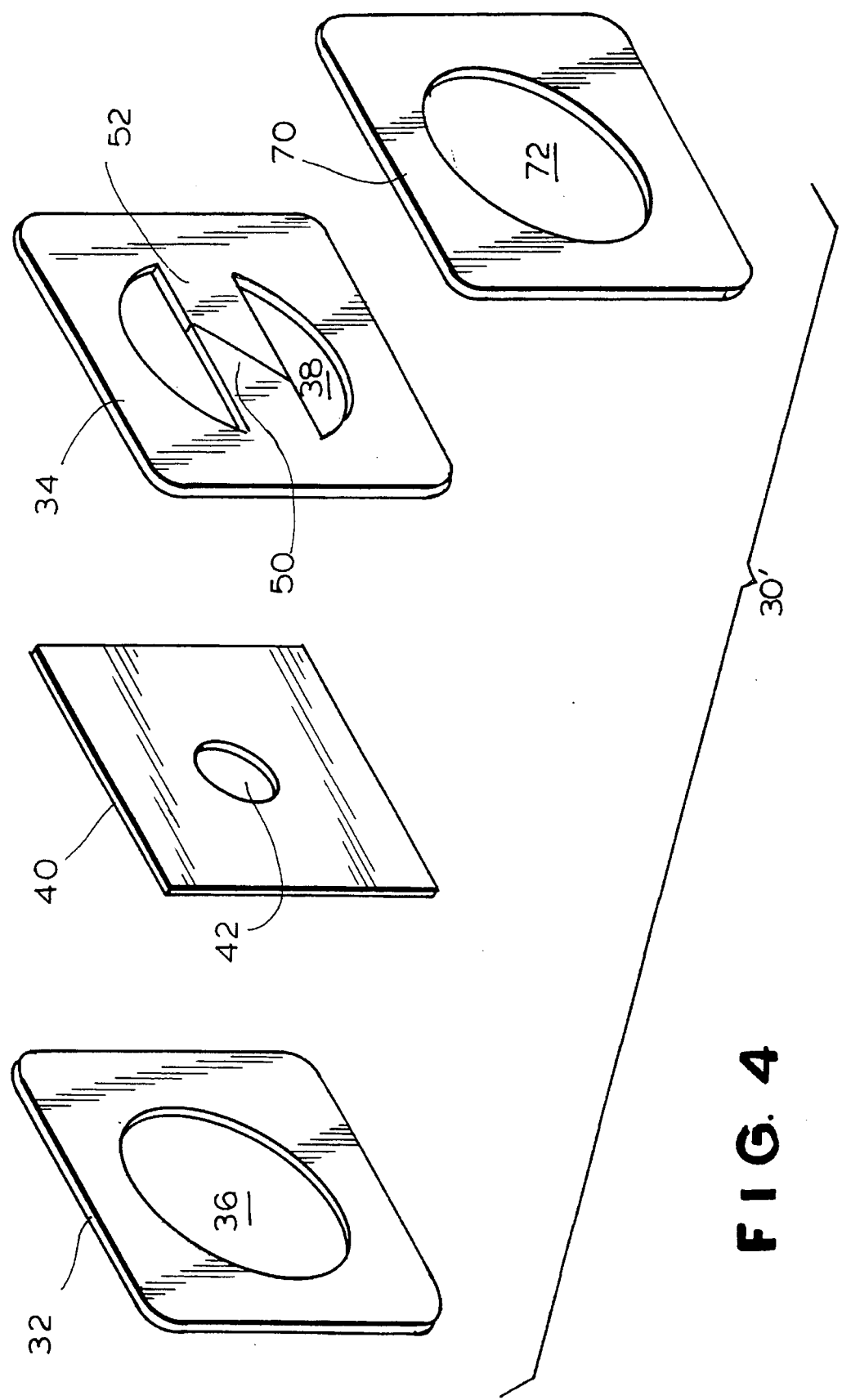
FIG. 4 is an exploded isometric view of the self-sealing, self-aligning collar of a vacuum bag according to the present invention.

Referring now to FIG. 4, therein illustrated is a collar according to the present invention, generally designated 30'. The collar 30' is both self-sealing (due to the presence of fingers 50, 52) and self-aligning with a vacuum inlet (due to the presence of a fourth panel 70). The self-aligning feature is achieved without sacrifice of the self-sealing feature by adding to the conventional self-sealing collar, as described above, a third planar panel 70 disposed parallel to and outwardly of the pair of panels 32, 34. Thus the third panel 70 may be adhesively bonded to the outer margin of the outer panel 34, outside of the outer panel aperture 38 and the fingers 50, 52. The third panel 70 defines a respective third aperture 72 therethrough which is configured and dimensioned for receipt of the vacuum inlet 14 therethrough and aligned with the apertures 36, 38 of the pair of panels 32, 34. The third aperture is of a thickness to facilitate blind placement of the collar 30' on vacuum inlet 14 and is preferably of the same thickness (about ⅛ inch) as the other panels 32, 34 as illustrated. The third panel 70 may be inclined about aperture 72 to facilitate such self-alignment, i.e., entry of inlet 14 into aperture 72.

Referring now to FIG. 5, therein illustrated is a self-sealing, self-aligning vacuum bag according to the present invention, generally designated 10'. The bag 10' is formed by combining the bag means 20 and the collar 30'.

Referring now to FIG. 6, therein illustrated is the bag 10' with its collar 30' (and in particular the third panel 70) being mounted on a vacuum inlet 14. As earlier noted, the third panel aperture 72 is configured and dimensioned to receive the vacuum inlet 14. After only a limited amount of blind movement of the collar 30' relative to the inlet 14 by the user, the third panel aperture 72 has been entered by the tip of the vacuum inlet 14, thereby blocking further relative movement of the collar 30' and the vacuum inlet 14.

Referring now to FIG. 7, when the user senses that further relative motion is blocked, he has only to push the collar 30' further onto the vacuum inlet 14 so that the tip of the vacuum inlet 14 causes the fingers 50, 52 to pivot inwardly, thus enlarging the membrane aperture 42. Depending upon the configuration and dimensions of the vacuum inlet 14, the inlet 14 passes through all three panel apertures 72, 36, 38 and through the membrane aperture 42 into the bag interior 22. The fingers 50, 52 are of such a length that they enter the membrane aperture 42 and extend further therefrom so that, when the inlet 14 is removed from the bag 10', the membrane 40 will force the fingers 50, 52 inwardly across the shrinking membrane aperture 42 from the rear until they are substantially parallel to the membrane 70 and extend across the membrane aperture 42 to collectively effectively close such membrane aperture 42.

The bag 10' of the present invention is simple and economical to manufacture. Furthermore, it may be manufactured on the existing commercial equipment for making the self-sealing bags of the type described herein simply by modifying them to apply a third apertured panel thereto. Thus the advantages of a self-sealing, self-aligning collar may be achieved with only a minor modification of the existing bag-manufacturing facility.

The bag 10' of the present invention may be used with both upright and canister styles and with both clean and dirty air models, although its particular advantageousness is realized especially when it is used with the upright style.

To summarize, the present invention provides a vacuum bag having a self-sealing and self-aligning collar, even though the collar may employ finger means extending in the plane of and at least partially across the panel aperture for blocking the membrane aperture. The vacuum bag facilitates blind placement of the collar on a vacuum inlet, especially the vacuum inlet of an upright model of a clean air type of vacuum device. The bag is simple and economical to manufacture.

Now that the preferred embodiments of the present invention have been shown and described in detail, various modifications and improvements therein will become readily apparent to those skilled in the art. Accordingly, the spirit and scope of the present invention is to be interpreted broadly and limited only by the appended claims, and not by the foregoing specification.

I claim:

1. In a vacuum bag for use with a vacuum device having a dirty air vacuum inlet, said bag comprising:
   (A) porous bag means for trapping dirt, dust and particles therein while allowing air to pass therethrough under the influence of a vacuum thereabout, said bag means defining a bag interior and a channel through said bag means thereinto; and
   (B) a self-sealing collar secured to said bag means and communicating with said bag interior via said channel, said collar including:
      (i) a pair of parallel planar panels defining aligned respective apertures therethrough configured and dimensioned for receipt of a vacuum inlet therethrough,
      (ii) a resilient membrane disposed intermediate said pair of panels, said membrane defining an aperture therethrough aligned with but smaller than said panel apertures, and
      (iii) at least one finger means on the outer of said pair of panels normally extending inwardly in the plane of said outer panel at least partially across the outer panel aperture prior to placement of said collar on a vacuum inlet, extending through said membrane aperture and past the inner of said pair of said panels when said collar is disposed on a vacuum inlet, and extending substantially parallel to and partially behind said membrane and across said membrane aperture to effectively close said membrane aperture when said collar is removed from a vacuum inlet;

the improvement wherein said collar is self-aligning with a vacuum inlet and includes a third planar panel disposed parallel to and outwardly of said pair of panels, said third panel defining a respective third aperture therethrough configured and dimensioned for receipt of a vacuum inlet therethrough and aligned with said apertures of said pair of panels, said third aperture being of a thickness to facilitate blind placement of said collar on a vacuum inlet, said third aperture being configured and dimensioned to cooperate with a vacuum inlet extending therethrough to block further relative lateral movement of said collar and the vacuum inlet, said collar consisting essentially of only said three panels, said membrane and said finger means.

2. In combination the bag of claim 1 and a vacuum device having a dirty air inlet extending through said three panel apertures and said membrane aperture of said collar.

3. The combination of claim 2 wherein said vacuum device is an upright model.

4. The combination of claim 2 wherein said vacuum device is an upright model of the clean air type.

5. The bag of claim 1 wherein each of said panels has about the same thickness.

6. The bag of claim 1 wherein said collar has a pair of diametrically opposed finger means extending inwardly towards one another from diametrically opposite sides of said outer panel aperture.

7. The bag of claim 1 wherein said third panel defines a respective third aperture with a sidewall inclined to facilitate self-alignment of said collar on a vacuum inlet.

8. In a vacuum bag for use with a vacuum device having a dirty air vacuum inlet, said bag comprising:
   (A) porous bag means for trapping dirt, dust and particles therein while allowing air to pass therethrough under the influence of a vacuum thereabout, said bag means defining a bag interior and a channel through said bag means thereinto; and (B) a self-sealing collar secured to said bag means and communicating with said bag interior via said channel, said collar including:
   (i) a pair of parallel planar panels defining aligned respective apertures therethrough configured and dimensioned for receipt of a vacuum inlet therethrough,
   (ii) a resilient membrane disposed intermediate said pair of panels, said membrane defining an aperture aligned with but smaller than said panel apertures, and
   (iii) a pair of diametrically opposed finger means extending inwardly towards one another from diametrically opposite sides of said outer panel aperture, said finger means being disposed on the outer of said pair of panels and normally extending inwardly in the plane of said outer panel at least partially across the outer panel aperture prior to placement of said collar on a vacuum inlet, extending through said membrane aperture and past the inner of said pair of said panels when said collar is disposed on a vacuum inlet, and extending behind and substantially parallel to said membrane and across said membrane aperture to collectively effectively close said membrane aperture when said collar is removed from a vacuum inlet;

the improvement wherein said collar is self-aligning with a vacuum inlet and includes a third planar panel disposed parallel to and outwardly of said pair of panels, said third panel defining a respective third aperture therethrough configured and dimensioned for receipt of a vacuum inlet therethrough and aligned with said apertures of said pair of panels, said third aperture being of a thickness to facilitate blind placement of said collar on a vacuum inlet, said third aperture being configured and dimensioned to cooperate with a vacuum inlet extending therethrough to block further relative lateral movement of said collar and the vacuum inlet, said collar consisting essentially of only said three panels, said membrane and said finger means.

9. In combination the bag of claim 1 and an upright vacuum device of the clean air type having a dirty air inlet extending through said three panel apertures and said membrane aperture of said collar.

\* \* \* \* \*